UNITED STATES PATENT OFFICE.

GEORGE W. CHAMBERLIN AND ANDREW S. COMERER, OF STERLING, ILL.

ARTIFICIAL STONE.

SPECIFICATION forming part of Letters Patent No. 255,936, dated April 4, 1882.

Application filed February 17, 1882. (No specimens.)

*To all whom it may concern:*

Be it known that we, GEORGE W. CHAMBERLIN and ANDREW S. COMERER, both of the city of Sterling, in the county of Whiteside and State of Illinois, have invented a new and useful Compound for the Manufacture of Artificial Stone, which compound and the mode of utilizing the same are fully described in the following specification.

This invention relates to a composition and method of combining the same for the manufacture of artificial stone; and it consists essentially in a certain preparation and intermixing of three elementary prepared mixtures, which, for convenience, we shall number herein 1, 2, and 3 respectively.

To make our artificial stone, take clean sand, three and one-half (3½) parts, and Portland cement, one (1) part, in sufficient aggregate quantity to produce the bulk of material necessary to make the required stone, and mix thoroughly together. This is number one (1.) Then take silicate of soda, one gallon, carbonate of iron, one pound, graphite, one and one-half (1½) pound, raw umber, two (2) pounds, rain-water at the boiling temperature, two (2) gallons, and mix thoroughly together. This is number two (2.) Then in a separate vessel put one gallon of number two (2) with five (5) gallons of water and mix thoroughly. This is number three (3.) Then take enough of number three (3) to reduce number one (1) to a working consistency and tamp the same into a mold of the shape desired for the stone, and after troweling the upper surface smoothly remove the mold, and the stone is made and ready for drying.

If desired, the stone may while drying have its surface occasionally dampened with a solution of one (1) part of silicate of soda to eight of water, which will give the stone a flinty glistening surface.

What we claim as our invention, and desire to secure by Letters Patent of the United States, is—

A compound for artificial stone, consisting of three and one-half parts of clean sand to one part of Portland cement, mixed thoroughly, and combined, in a working consistency, with a composition consisting on the one part of five gallons of water and on the other part of one gallon of the mixture made of the following ingredients and in the following proportions, to wit: one gallon of silicate of soda, one pound of carbonate of iron, one and one-half pound of graphite, two pounds of raw umber, and two gallons of rain-water at the boiling temperature, all thoroughly mixed, substantially as described, and for the purpose specified.

In witness whereof we affix our signatures in the presence two witnesses.

GEO. W. CHAMBERLIN.
  ANDREW S. COMERER.

Witnesses:
 V. S. FERGUSON,
 A. F. SPOONER.